(12) United States Patent
    Wright

(10) Patent No.: US 8,194,098 B2
(45) Date of Patent: *Jun. 5, 2012

(54) APPARATUS, METHOD, AND PRODUCT FOR DOWNSCALING AN IMAGE

(75) Inventor: Burton Wright, Sunnyvale, CA (US)

(73) Assignee: Round Rock Research, LLC, Mt. Kisco, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/469,330

(22) Filed: May 20, 2009

(65) Prior Publication Data

US 2009/0225101 A1    Sep. 10, 2009

Related U.S. Application Data

(63) Continuation of application No. 11/426,471, filed on Jun. 26, 2006, now Pat. No. 7,545,388, which is a continuation of application No. 09/945,515, filed on Aug. 30, 2001, now Pat. No. 7,116,841.

(51) Int. Cl.
    *G09G 5/00* (2006.01)
    *G06K 9/32* (2006.01)
    *G06K 9/40* (2006.01)
    *H04N 7/01* (2006.01)
    *H04N 1/46* (2006.01)

(52) U.S. Cl. ........ 345/619; 345/606; 345/660; 348/448; 348/458; 348/581; 358/525; 382/260; 382/298

(58) Field of Classification Search .................. None
    See application file for complete search history.

(56) References Cited

U.S. PATENT DOCUMENTS

| | | | |
|---|---|---|---|
| 5,327,257 | A | 7/1994 | Hrytzak et al. |
| 5,461,655 | A | 10/1995 | Vuylsteke et al. |
| 5,473,342 | A | 12/1995 | Tse et al. |
| 5,517,612 | A | 5/1996 | Dwin et al. |
| 5,574,572 | A | 11/1996 | Malinowski et al. |
| 5,592,194 | A | 1/1997 | Nishikawa |
| 5,798,767 | A | 8/1998 | Poole et al. |
| 5,838,835 | A | 11/1998 | Martens |
| 5,847,772 | A | 12/1998 | Wells |
| 5,850,208 | A | 12/1998 | Poole et al. |
| 5,874,937 | A | 2/1999 | Kesatoshi |
| 5,905,822 | A | 5/1999 | Ito et al. |
| 6,005,580 | A | 12/1999 | Donovan |
| 6,016,164 | A | 1/2000 | Kawaguchi et al. |
| 6,097,400 | A | 8/2000 | Dilliplane et al. |
| 6,097,855 | A | 8/2000 | Levien |
| 6,151,074 | A | 11/2000 | Werner |
| 6,157,414 | A | 12/2000 | Sakamoto |
| 6,211,804 | B1 | 4/2001 | Kaplinsky |
| 6,256,045 | B1 | 7/2001 | Bae et al. |
| 6,377,280 | B1 | 4/2002 | Acharya et al. |
| 6,456,212 | B1 | 9/2002 | Kaplinsky |
| 6,469,700 | B1 | 10/2002 | Munshi et al. |

(Continued)

*Primary Examiner* — Tize Ma
(74) *Attorney, Agent, or Firm* — Lerner, David, Littenberg, Krumholz & Mentlik, LLP

(57) ABSTRACT

An average filter or filters is used in line with the output of an interpolation filter to downscale an image. The interpolation filter upscales a source image or bitmap of pixels into an intermediate form and the average filter or filters downscales the intermediate form to a destination image or bitmap of pixels. This configuration incorporates a small amount of logic with a relatively low incremental cost, enabling high quality downscaling of text and computer graphics content. The invention achieves quality comparable to a filter/scalar combination with more taps or a separate decimation pass.

20 Claims, 4 Drawing Sheets

U.S. PATENT DOCUMENTS

| | | |
|---|---|---|
| 6,510,254 B1 | 1/2003 | Nakami et al. |
| 6,553,153 B1 * | 4/2003 | Cui ............................. 382/298 |
| 6,587,117 B1 | 7/2003 | Wright et al. |
| 6,714,692 B1 | 3/2004 | Kim et al. |
| 6,757,431 B2 | 6/2004 | Loce et al. |
| 7,116,841 B2 | 10/2006 | Wright |
| 2003/0107506 A1 | 6/2003 | Kaplinsky |
| 2006/0233463 A1 | 10/2006 | Wright |

\* cited by examiner

APPARATUS, METHOD, AND PRODUCT FOR DOWNSCALING AN IMAGE

RELATED APPLICATIONS

This application is a Continuation of U.S. application Ser. No. 11/426,471, filed Jun. 26, 2006, now issued as U.S. Pat. No. 7,545,388, which is a Continuation of application Ser. No. 09/945,515, filed Aug. 30, 2001, now issued as U.S. Pat. No. 7,116,841, which are incorporated herein by reference in their entirety.

FIELD OF THE INVENTION

The invention relates to the field of computers. More specifically, the invention relates to downscaling a digital image.

BACKGROUND

Modern data processing systems are capable of manipulating and displaying digital images on a display screen. These images may be still, such as a photograph, or moving, such as a movie. The data processing system treats the images as a source of data that may be displayed and manipulated by the user. A user may wish to alter the image by changing its size or location. Altering the size of the image is commonly referred to as "scaling" the image. Scaling an image means enlarging (upscaling) or shrinking (downscaling) the size of the image.

A digital image on a display screen, whether still or moving, is stored in memory as an array (also called a bitmap) of pixels (digital picture elements). Pixels in digitized color images typically include color components, or data bits, for luminance and for chrominance. When a color image is scaled, each of the color components must be scaled. The array contains conceptual rows and columns of pixels corresponding to horizontal rows and vertical columns on the display screen. The system that creates the image determines the number of pixels in each row and column. When the image is to be displayed in a system that uses the same number of pixels in each row and column as the source image, the image can be displayed directly.

But, sometimes the image is transmitted to a different system that uses a different number of pixels in each row and/or a different number of columns from the source image. Also, sometimes the user desires to change the size of the displayed image. In these cases, the system must scale (upscale or downscale) the image, so that the same image can be displayed using a new array of pixels. For example, an image comprising a 500 by 750 array of pixels must be scaled up before it can be displayed in a system that uses an array of 1024 by 768 pixels. Conversely, the same image must be scaled down before it can be displayed in a system using an array of only 256 by 192 pixels. To upscale an image, the system adds pixels. To downscale an image, the system removes pixels through a process called decimation.

Consider the following example of upscaling an image. A compressed video image may be stored with a size of 5 pixels per row (i.e., 5 vertical columns) and 3 pixels per column (i.e., 3 horizontal rows), for a total of 15 stored pixels representing the video image. This video image can be upscaled in both the vertical and horizontal directions for display. The upscaled video image size might be 7 pixels per row (7 vertical columns) and 5 horizontal rows, or 35 total pixels. In order to create the final video image, the system places the original 15 pixels at the appropriate locations within the final image. But, 35−15=20 pixels are still needed to complete the image. These 20 pixels have unknown pixel values, which the system must determine in order to produce a final image. (Of course, those skilled in the art will recognize that for some scaling factors, all 15 original pixels might not be used.)

Several methods are currently utilized to assign values to these unknown pixels when upscaling. One such method is called bilinear interpolation, which uses a weighted average of the pixel values surrounding the pixel having an unknown value, taking into account the relative location of the surrounding pixels. The weighted average value is then assigned to the pixel having the unknown value. The purpose of bilinear interpolation is to fill in a smooth transition between the known pixels.

Various devices and methods for downscaling an image are also available. They either rely on multiple decimation passes through the array, or they incorporate multiple samples (also called taps) of data from the array. Because of the extra processing required, these techniques suffer from degraded performance and high cost. Thus, there is a need for a technique that overcomes the problems of the prior art and provides downscaling with better performance at a lower cost.

BRIEF DESCRIPTION OF THE DRAWINGS

These and other aspects and advantages of the present invention will become apparent upon reading the following detailed description and upon reference to the drawings, in which.

DETAILED DESCRIPTION

In the following detailed description of embodiments of the invention, reference is made to the accompanying drawings (where like numbers represent like elements), which form a part hereof, and in which is shown by way of illustration specific embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1A:
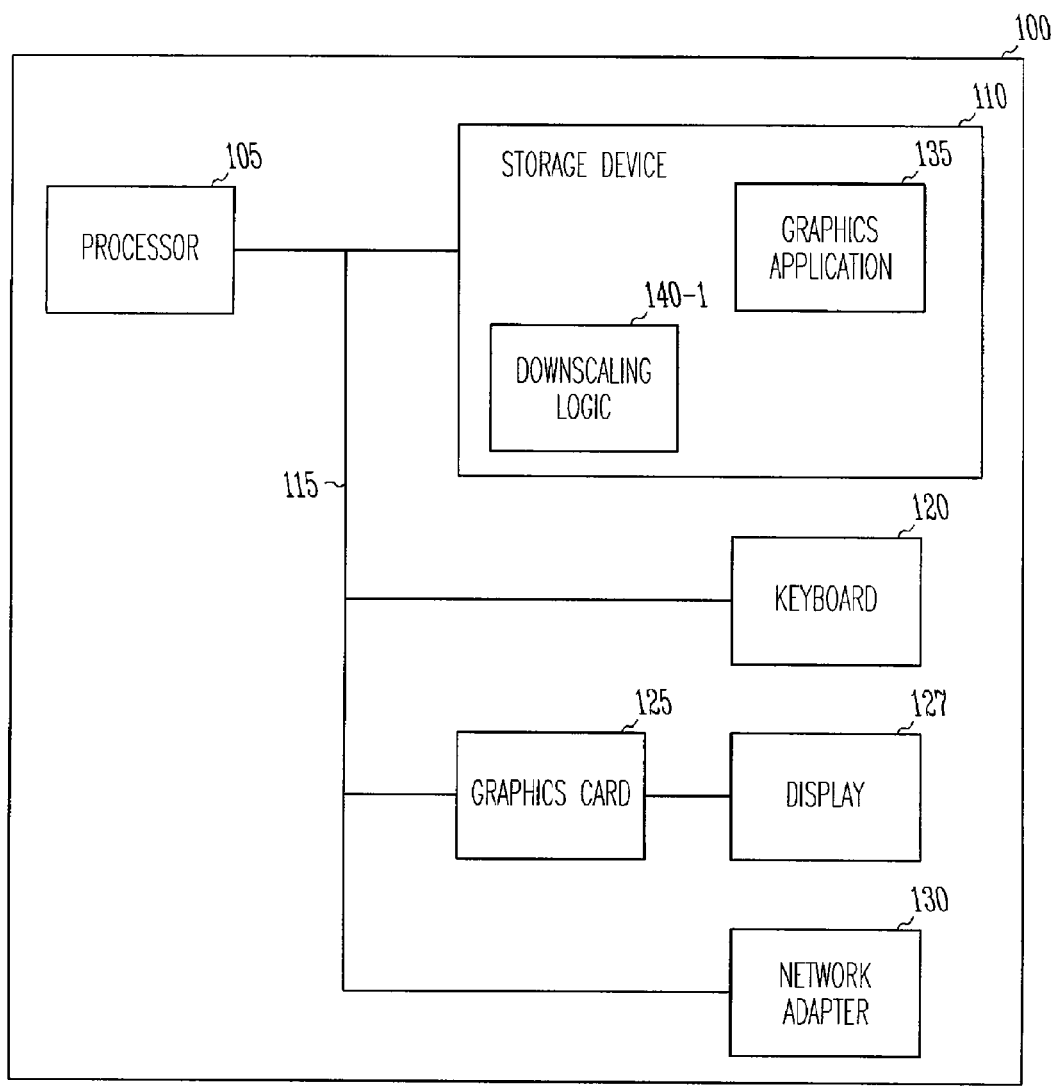
FIG. 1A depicts a block diagram illustrating a computer according to one embodiment of the present invention.

FIG. 1A shows a block diagram illustrating a computer 100 according to one embodiment of the invention. Computer 100 includes processor 105, storage device 110, keyboard 120, graphics card 125, and network adapter 130, all communicatively coupled via bus 115. Graphics card 125 connects one or more display devices 127 to bus 115. An unillustrated network may also be coupled to bus 115 through network adapter 130.

Processor 105 represents a central processing unit of any type of architecture, such as a CISC, RISC, VLIW, or a hybrid architecture. While this embodiment is described in relation to a single processor computer, in another embodiment the invention can be implemented in a multi-processor computer. Storage device 110 represents one or more mechanisms for storing data. For example, storage device 110 can include read only memory (ROM), random access memory (RAM), magnetic disk storage mediums, optical storage mediums, flash memory devices, and/or other machine-readable mediums. Bus 115 represents one or more busses (e.g., PCI, ISA, X-Bus, EISA, VESA, or any other appropriate bus) and bridges (also termed bus controllers).

FIG. 1A also illustrates that storage device 110 has stored therein graphics application 135 for execution on processor 105. In addition, in one embodiment, storage device 110 includes downscaling logic routines 140-1 for execution on processor 105. Of course, the storage device 110 can also contain additional software (not shown), which is not necessary to understanding the invention. In one embodiment, one or more routines of graphics application 135 are executed on processor 105 to generate a source bitmap (e.g., geometry data, including polygon data and color data; texture map data; control/state data; and other appropriate data) concerning an image to be displayed on the one or more display devices 127. This data is then transmitted to downscaling logic 140-1. In response to receiving this data, downscaling logic 140-1, executing on processor 105, renders a set of pixel data (referred to herein as the "destination image") representative of the image and causes that destination image to be displayed on one or more of the display devices 127, as further described below with reference to FIG. 3. Other embodiments for the downscaling logic are described in FIGS. 1B and 1C. Although graphics application 135 is shown to be in the same storage device as downscaling logic 140-1, in another embodiment there are in different storage devices. In still another embodiment, graphics application 135 and downscaling logic 140-1 are in different computers and communicate via network adapter 130.

Graphics card 125 can be implemented to perform any number of techniques to render the destination image, including but not limited to depth cueing, depth clipping, visible line determination, visible surface determination, reflection mapping, illumination, and/or texture mapping.

Computer 100 can be implemented using any suitable computer such as a personal computer available from a number of vendors. Portable computers, laptop computers, and network computers or Internet appliances are other possible configurations. The hardware depicted in FIG. 1A may vary for specific applications. For example, other peripheral devices such as optical-disk media, audio adapters, or chip programming devices, such as PAL or EPROM programming devices may be used in addition to or in place of the hardware already depicted. Thus, an embodiment of the invention can apply to any hardware configuration that allows downscaling an image, regardless of whether the hardware configuration is a complicated, multi-user computing apparatus, a single-user workstation, a monitor or display, a graphics card, or a network appliance that does not have non-volatile storage of its own.

As will be described in detail below, aspects of an embodiment pertain to specific apparatus and method elements implementable on computers, cards, and displays. In another embodiment, the invention can be implemented as a computer program product for use with a computer. The programs defining the functions of this embodiment can be delivered to a computer via a variety of signal-bearing media, which include, but are not limited to:

(1) information permanently stored on non-rewriteable storage media (e.g., read only memory devices within a computer such as CD-ROM readable by a CD-ROM drive;

(2) alterable information stored on rewriteable storage media (e.g., a hard disk drive or diskette); or (3) information conveyed to a computer by a communications media, such as through a computer or telephone network including wireless communications.

Such signal-bearing media, when carrying computer-readable instructions that direct the functions of the present invention, represent embodiments of the present invention.

Figure 1B:
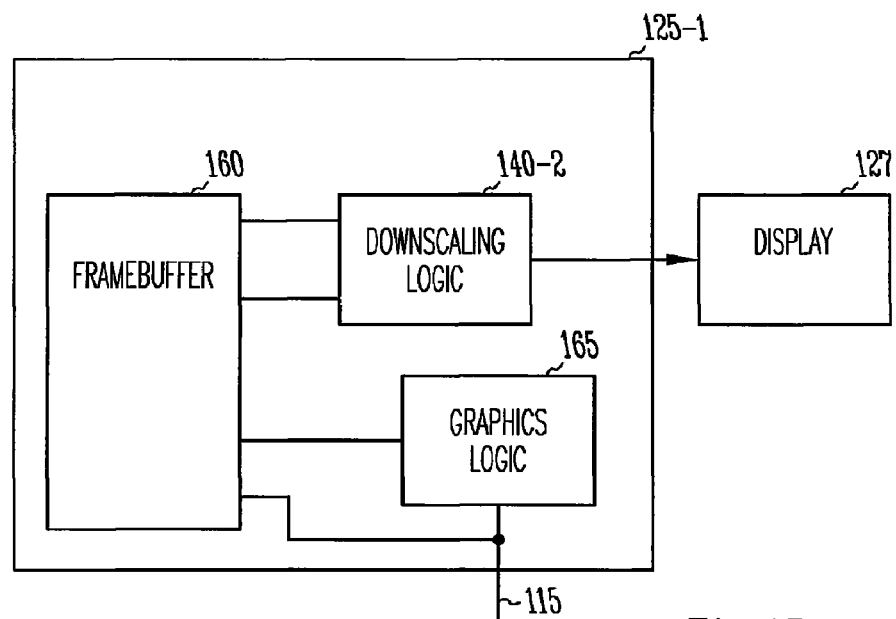
FIG. 1B depicts a block diagram illustrating a graphics card according to another embodiment of the present invention.

FIG. 1B depicts a block diagram illustrating a graphics card according to another embodiment of the present invention. In the embodiment of FIG. 1B, downscaling logic 140-2 is contained within graphics card 125-1, instead of within storage device 110. Downscaling logic 140-2 can be implemented wholly in hardware, wholly in software executing on an unillustrated processor within graphics card 125-1, or a combination of both, such as firmware. Graphics card 125-1 is communicatively coupled to display 127 and bus 115. Graphics card 125-1 also includes frame buffer 160, which is communicatively coupled to downscaling logic 140-2 and graphics logic 165.

Figure 1C:
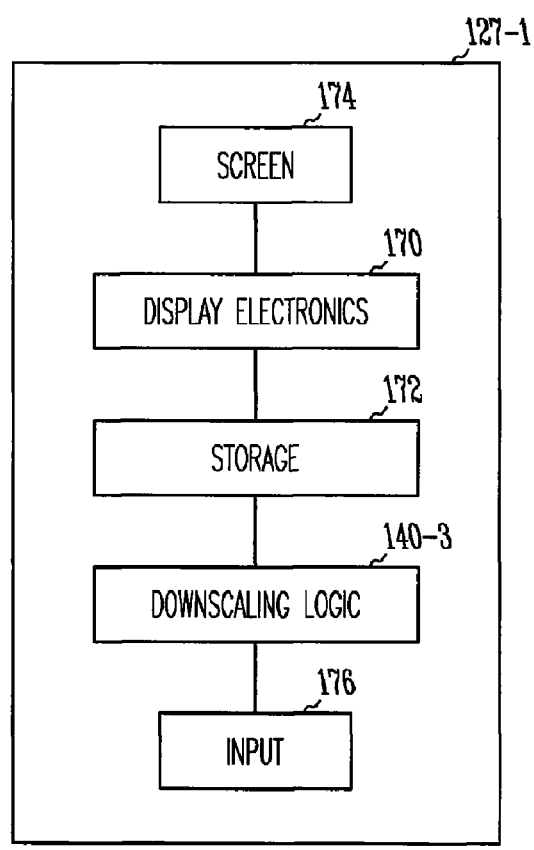
FIG. 1C depicts a block diagram illustrating a display device according to another embodiment of the present invention.

FIG. 1C depicts a block diagram illustrating a display device according to another embodiment of the present invention. In the embodiment of FIG. 1C, downscaling logic 140-3 is contained within display device 127-1, instead of within storage device 110 from FIG. 1A. Downscaling logic 140-3 can be implemented wholly in hardware, wholly in software executing on an unillustrated processor within display device 127-1, or a combination of both, such as firmware. Display device 127-1 may also include display electronics 170, storage 172, and screen 174. The output of downscaling logic 140-3 may be stored in storage 172, which may be accessed by display electronics 170 in order to display text and images on screen 174. Display device 127-1 is communicatively coupled to input 176, which may be bus 115 or graphics card 125.

The hardware and/or software used in one embodiment of downscaling logic 140-1, 140-2, and 140-3 will now be described in more detail. Of course, alternative embodiments may use different combinations of hard-wired circuitry and/or software instructions to implement the invention. For example, the downscaling logic may be implemented wholly in hardware, wholly in software, or a combination of both. In addition, alternative embodiments may distribute the processing between processor 105, graphics card 125, and display devices 127 in a different manner. Further, storage device 110, graphics card 125 and 125-1, and display device 127 and 127-1 can be distributed on other computers and accessed, for example, through network adapter 130. Thus, the invention is not limited to any specific combination of hardware circuitry and software.

Figure 2:
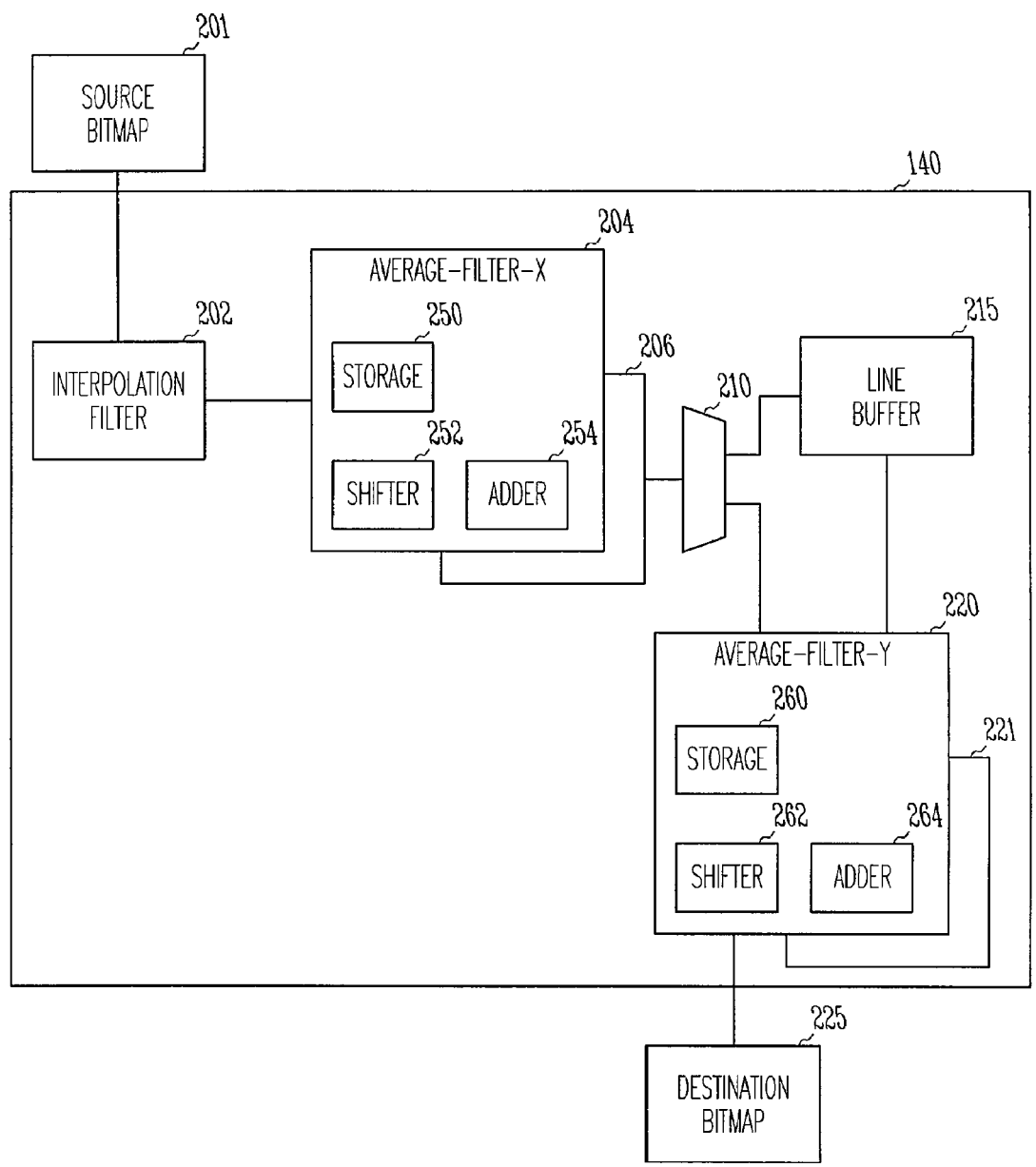
FIG. 2 depicts a block diagram illustrating further detail of select elements of an embodiment of the present invention.

FIG. 2 depicts a block diagram of the organization of downscaling logic 140, which is communicatively coupled to source bitmap 201 and destination bitmap 225. Source bitmap 201 has a source width and height, which represents the number of pixels in a row and column, respectively, of the source. Likewise, destination bitmap 225 has a destination width and height, which represents the number of pixels in a row and column, respectively, of the destination. Downscaling logic 140 represents the organization of elements 140-1, 140-2, and/or 140-3. In some embodiments, the elements within downscaling logic 140 represent hardware components. In other embodiments, the elements within downscaling logic 140 represent software components. In still other embodiments, the elements within downscaling logic 140 represent a combination of hardware and software components. Downscaling logic 140 inputs data representing an image from source bitmap 201 at the source width and source height, upscales the image to an intermediate bitmap, downscales the image, and outputs data to destination bitmap 225 at the destination width and destination height.

Downscaling logic 140 includes interpolation filter 202, which receives data from source bitmap 201 and performs interpolation on the data. In one embodiment, filter 202 is a bilinear filter that performs bilinear interpolation, but in another embodiments any appropriate interpolation filter that upscales an image can be used, including but not limited to a Lagrange interpolation filter. Bilinear interpolation uses a weighted average of the pixel values surrounding a pixel having an unknown value, taking into account the relative location of the surrounding pixels. The weighted average value is then assigned to the pixel having the unknown value. Ordinarily, bilinear interpolation is used to upscale an image, but downscaling logic 140 is using interpolation filter 202 to upscale an image as an intermediate step in a process that ultimately downscales the image.

In order to combine the color components of the pixels, in one embodiment interpolation filter 202 performs bilinear interpolation on four samples from the source bitmap, and the samples are determined as if the source were being scaled to the destination size raised to some power of two (e.g., 2, 4, 8, etc.), which is also called a scale factor. The scale factor is large enough so that interpolation filter is performing upscaling. The size of the output of interpolation filter 202 is calculated so that it is equivalent to the destination width and/or height multiplied by the scale factor, which is a power of two.

The scale factor determines the number of average filters, shown as 204, 206, 220, and 221 in FIG. 2. When the scale factor is two, one average-x filter 204 is used. When the scale factor is four, two average-x-filters 204 and 206 are used. When the scale factor is 8, there are 4 average-x filters, and so on. In some embodiments, the average-x filter and the average-y filter use the same scale factor, so that the number of average-y filters correspond to the number of average-x filters. In other embodiments, the average-x and average-y filters use different scale factors, so the number of filters is different. In still other embodiments, the average-y filter is not present or if present, not used. The invention is not so limited.

In one embodiment, the scale factor used is based on the destination width. In another embodiment, the scale factor used is based on the destination height. In still another embodiment, the scale factor used is based on both the destination width and height. In one embodiment, the same scale factor is used for both height and width. In another embodiment, different scale factors are used for height and width.

Average-filter-x 204, 206 averages horizontally the output of interpolation filter 202 on a two-by-two pixel basis, using an add/shift arrangement for each power of two. Average-filter-y 220, 221 likewise vertically averages on a two-by-two pixel basis using an add/shift arrangement for each power of two. While FIG. 2 depicts two horizontal averaging filters labeled average-filter-x 204 and 206, more or fewer horizontal averaging filters can be used, depending on the particular scale factor (power of two) used. While FIG. 2 depicts two vertical averaging filters labeled average-filter-y 220 and 221, more or fewer vertical averaging filters can be used, depending on the particular scale factor (power of two) used.

Average-filter-x 204, 206 includes storage 250 for storing a pixel, shift logic 252 for each color component and each power of two, and adder logic 254. Averaging along the vertical axis, in cases where it is necessary, involves line buffer 215, shown in FIG. 2 coupled to the output of selector 210 and providing input to average-filter-y 220, 221. Line buffer 215 includes storage with a size of half of the maximum destination length for downscaling and half of the length of the preceding row for each additional power of two decimation capability thereafter. Average-filter-y 220, 221 includes storage 260 for storing a pixel, shift logic 262 for each color component and each power of two, and adder logic 264. Both line buffer 215 and average-filter-y 220, 221 are optional in some embodiments, and in cases in which averaging is not performed along the vertical axis these components are either not used or in other embodiments, not present. Selector 210 directs the output of average-filter-x 204, 206 to both line buffer 215 and average-filter-y 220, 221.

For every two pixel results in the output of the interpolation filter 202 and every power of two scale factor, average-filter-x 204, 206 averages the two values, defined as:

$$Color[X]=(Color[X]+Color[X-1])>>1,$$

where ">>" denotes a right-shift operation, "X" is a pixel color component, and "X−1" is a pixel component of the pixel previous to pixel "X" in the same row. Pixels in digitized color images include color components, which in some embodiments are data bits for luminance and for chrominance. But, in other embodiments any color components can be used. When a color image is scaled, each of the color components is employed in the calculation of the final value for the pixel.

For embodiments using vertical interpolation, the results of this operation are stored for alternating lines, i.e., the first line of each pair in the bitmap now has virtual dimensions of:

$$DstWidth*(DstHeight*n),$$

where DstWidth and DstHeight are the destination width and height, respectively, and "n" is the scale factor.

The average-filter-y combines the second line of each pair of the output of the interpolation filter 202 with the corresponding pixel stored from the previous line, for each horizontally averaged pixel, defined as:

$$Color[X]=(ColorCurrent[X,Y]+ColorCurrent[X,Y-1])>>1,$$

where ">>" denotes a right-shift operation, and "X" and "Y" are a pair of pixel color components. "Y−1" represents the color component of the pixel in the previous line and same column as the pixel represented by "Y". Average-filter-y 220, 221 obtains ColorCurrent[X,Y] from the average-x-filter. Average-filter-y 220, 221 obtains ColorCurrent[X,Y−1] from the output of line buffer 215.

Figure 3:
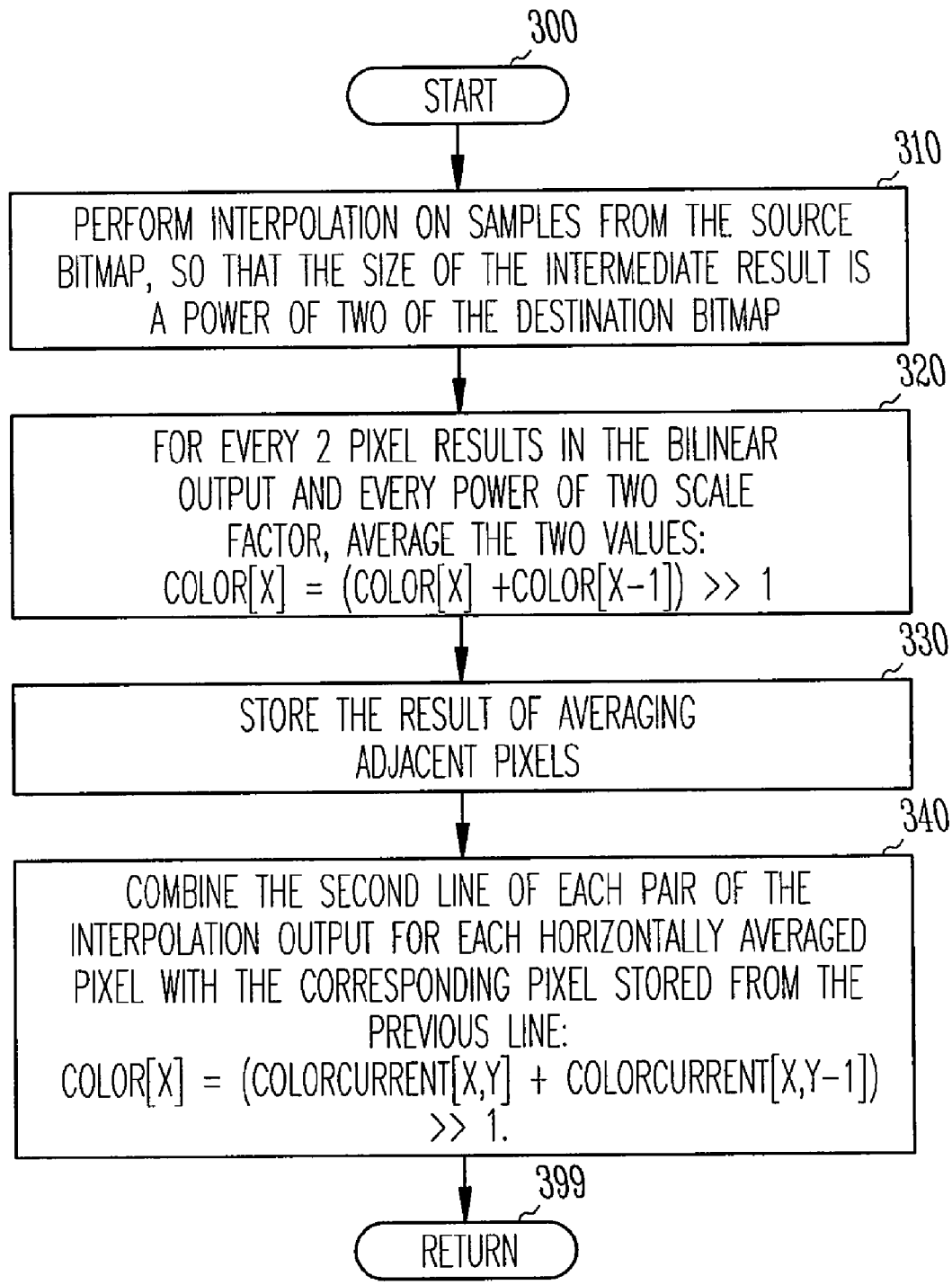
FIG. 3 depicts a flowchart that illustrates the performing of downscaling, according to an embodiment of the present invention.

FIG. 3 depicts a flowchart that illustrates a method performed by downscaling logic 140, according to an embodiment of the present invention. The following description for FIG. 3 makes reference to the components in FIGS. 1 and 2 with the appropriate reference numerals designated in connection with the same. Control begins at block 300. Control then continues to block 310 where interpolation filter 202 receives data from source bitmap 201 and performs interpolation on a number of samples, four in one embodiment, from the source bitmap to upscale the source, so that the size of the output from interpolation filter 202 is equivalent to the destination width and/or height multiplied by the scale factor.

Control then continues to block 320 where average-filter-x averages horizontally the output of interpolation filter 202 on a two-by-two pixel basis, using an add/shift arrangement provided by adder 254 and shifter 252 for each power of two. For every two pixel results in the output of the interpolation filter 202 and every power of two scale factor, average-filter-x 204, 206 averages the two values, defined as:

Color[X]=(Color[X]+Color[X−1])>>1, where ">>" denotes a right-shift operation, "X" is a pixel color component, and "X−1" is a pixel component of the pixel previous to pixel "X" in the same row. Pixels in digitized color images typically include data bits for luminance and for chrominance. When a color image is scaled, each of the color components is scaled.

Control then continues to block 330 where, for embodiments using vertical interpolation, selector 210 stores the output of average-filter-x in line buffer 215 for alternating lines, i.e., the first line of each pair in the bitmap that now has virtual dimensions of:

DstWidth*(DstHeight*n), where DstWidth and DstHeight are the destination width and height, respectively, and "n" is the scale factor.

Control then continues to block 340 where average-filter-y combines the second line of each pair of the output of the interpolation filter 202 with the corresponding pixel stored from the previous line, for each horizontally averaged pixel, defined as:

Color[X]=(ColorCurrent[X,Y]+ColorCurrent[X,Y−1])>>1, where ">>" denotes a right-shift operation, and "X" and "Y" are a pair of pixel color components. "Y−1" represents the color component of the pixel in the previous line and same column as the pixel represented by "Y". Average-filter-y obtains ColorCurrent[X,Y] from the average-x-filter. Average-filter-y obtains ColorCurrent[X,Y−1] from the output of line buffer 215. Thus, average-filter-y vertically averages on a two-by-two pixel basis using an add/shift arrangement provided by adder 264 and shifter 262 for each power of two.

CONCLUSION

The above mentioned and other deficiencies are addressed in the present description. According to various implementations of the present invention, an average filter or filters is used in line with the output of an interpolation filter to downscale an image.

The interpolation filter upscales a source image or bitmap of pixels to an intermediate form calculated to be a power-of-two multiple of the destination image. The result of the upscaling, the output of the interpolation filter, is then sent pixel by pixel through an average filter or cascaded array of average filters, so that the size of the final image to be stored is equal to the size of the final destination image.

By incorporating only a small amount of logic (i.e., the average filters or filters) and a small amount of intermediate storage, this configuration enables relatively high-quality downscaling of text and graphics output and incurs only minor incremental cost over simple interpolation-based scalars, whose outputs are generally limited to up-scaling satisfactorily.

As described above, the addition of average filters and small amounts of line storage allows simple filter types such as bilinear to achieve downscaling results comparable to filter/scalar combinations incorporating separate decimation passes and/or more taps.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. An apparatus for scaling image data, comprising:
    an interpolation filter configured to upscale a source image to an intermediate image by a scale factor of $2^N$, where N>1;
    an average filter configured to downscale the intermediate image to a destination image, wherein the average filter is configured to average the intermediate image on a two-by-two pixel basis, the average filter comprising $2^{N-1}$ horizontal average filters; and
    a line buffer configured to store output from the average filter, wherein the line buffer size is equal to half of a length of the destination image plus half of a length of a preceding line in the intermediate image.

2. The apparatus of claim 1, wherein each horizontal average filter includes shifter logic to shift color components of the intermediate image.

3. The apparatus of claim 1, wherein each horizontal average filter includes an adder to add color components of the intermediate image.

4. The apparatus of claim 1, wherein the intermediate image has a size equal to a size of the destination image adjusted by a scale factor.

5. The apparatus of claim 1, wherein the average filter works on geometry data.

6. The apparatus of claim 1, wherein the average filter works on a texture map.

7. An apparatus for scaling image data, comprising:
    an interpolation filter configured to upscale a source image to an intermediate image by a scale factor of $2^N$, where N>1;
    an average filter configured to downscale the intermediate image to a destination image, wherein the average filter comprises $2^{N-1}$ horizontal average filters, each horizontal average filter including storage to store a pixel; and
    a line buffer configured to store output from the average filter, wherein the line buffer size is equal to half of a length of the destination image plus half of a length of a preceding line in the intermediate image.

8. The apparatus of claim 7, wherein each horizontal average filter includes shifter logic to shift color components of the intermediate image.

9. The apparatus of claim 7, wherein each horizontal average filter includes an adder to add color components of the intermediate image.

10. The apparatus of claim 9, wherein the intermediate image has a size equal to a size of the destination image adjusted by a scale factor.

11. The apparatus of claim 7, wherein the average filter works on geometry data.

12. The apparatus of claim 7, wherein the average filter works on a texture map.

13. An apparatus for scaling a source image to a destination image, comprising:
    an interpolation filter, wherein the interpolation filter is configured to upscale the source image to an intermediate image, wherein the intermediate image has a size equal to a size of the destination image adjusted by a scale factor of $2^N$, where N>1;

an average filter configured to downscale the intermediate image to the destination image, wherein the average filter is configured to average the intermediate image on a two-by-two pixel basis, the average filter comprising $2^{N-1}$ horizontal average filters; and a line buffer configured to store output from the average filter, wherein the line buffer size is equal to half of a length of the destination image plus half of a length of a preceding line in the intermediate image.

14. The apparatus of claim 13, wherein the average filter averages two values as by the equation Color[XJ=(Color[X]+Color[X−1])>>1, where ">>" denotes a right-shift operation, "X" is a pixel component, and "X−1" is a pixel component of a pixel previous to pixel "X".

15. The apparatus of claim 14, wherein "X" and "X−1" are in a same row.

16. The apparatus of claim 15, wherein X pixel components are at least one of luminance and chrominance.

17. The apparatus of claim 13, wherein the average filter further comprises $2^{N-1}$ vertical average filters.

18. The apparatus of claim 17, wherein each horizontal average filter averages two values as by the equation Color (X)=(Color[X]+Color(X−1))>>1, where ">>" denotes a right-shift operation, "X" is a pixel component, and "X−1" is a pixel component of a pixel previous to pixel "X", and wherein each vertical average filter averages two values as by the equation Color [Y]=(Color(Y)+Color(Y−1))>>1, where ">>" denotes a right-shift operation, "Y" is a pixel component, and "Y−1" is a pixel component of a pixel previous to pixel "Y".

19. An apparatus for scaling image data, comprising;
a bilinear interpolation filter configured to upscale a source image to an intermediate image by a scale factor of $2^N$, where N>1;
an average filter configured to downscale the intermediate image to a destination image, the average filter comprising $2^{N-1}$ vertical average filters and $2^{N-1}$ horizontal average filters; and
a line buffer configured to store output from the average filter, wherein the line buffer size is equal to half of a length of the destination image plus half of a length of a preceding line in the intermediate image.

20. The apparatus of claim 19, wherein each vertical average filter includes storage to store a pixel, and each horizontal average filter includes storage to store a pixel.

* * * * *